United States Patent
Rake et al.

(10) Patent No.: US 9,518,650 B2
(45) Date of Patent: Dec. 13, 2016

(54) TRANSLATORY ACTIVATION DEVICE WITH INDIRECT LATCHING

(75) Inventors: Ludger Rake, Steinfeld (DE); Andreas Giefer, Lemfoerde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 625 days.

(21) Appl. No.: 13/695,767

(22) PCT Filed: Apr. 21, 2011

(86) PCT No.: PCT/EP2011/056404
§ 371 (c)(1),
(2), (4) Date: Feb. 15, 2013

(87) PCT Pub. No.: WO2011/138177
PCT Pub. Date: Nov. 10, 2011

(65) Prior Publication Data
US 2013/0139632 A1    Jun. 6, 2013

(30) Foreign Application Priority Data
May 5, 2010    (DE) ........................ 10 2010 028 624

(51) Int. Cl.
*F16H 59/02*    (2006.01)
*F16H 59/08*    (2006.01)
(Continued)

(52) U.S. Cl.
CPC ........... *F16H 59/0278* (2013.01); *B60K 37/06* (2013.01); *F16H 59/08* (2013.01); *F16H 61/24* (2013.01);
(Continued)

(58) Field of Classification Search
CPC ........ F16H 59/105; F16H 59/10; F16H 59/12; F16H 59/08; F16H 2059/0295; F16H 2061/243; F16H 2061/247; Y10T 74/20085; Y10T 74/2011; Y10T 74/20116; Y10T 74/2012; Y10T 74/2014; Y10T 74/18104
(Continued)

(56) References Cited

U.S. PATENT DOCUMENTS

| 1,559,427 A | * | 10/1925 | Hemphill | ............. | B60Q 1/1415 |
| | | | | | 200/4 |
| 3,499,127 A | * | 3/1970 | Long | .................... | H01H 19/001 |
| | | | | | 200/11 TW |

(Continued)

FOREIGN PATENT DOCUMENTS

| DE | 10 2004 049 0 | 4/2006 |
| EP | 1 580 462 A2 | 9/2005 |

(Continued)

OTHER PUBLICATIONS

Office Action from corresponding Japanese Application No. 2013-508426 dated Dec. 24, 2013, including English translation (6 pgs).
(Continued)

*Primary Examiner* — David M Fenstermacher
(74) *Attorney, Agent, or Firm* — Brinks Gilson & Lione

(57) ABSTRACT

An activation device for selecting shift stages of a shift-by-wire vehicle transmission comprises a housing and an activation knob which can be moved in a translatory fashion and a latching device with a latching pin and latching contour as latching elements for generating latching forces and restoring forces. The activation device is defined by a latching gearwheel which is in engagement with a toothing arrangement on the activation knob. In this context, one of the two latching elements is connected to the latching gearwheel and in this way forms a rotatable latching element. The second latching element is directly or indirectly connected to the base housing and forms the fixed latching element.

12 Claims, 6 Drawing Sheets

(51) Int. Cl.
  *F16H 61/24* (2006.01)
  *B60K 37/06* (2006.01)
  *F16H 61/32* (2006.01)
(52) U.S. Cl.
  CPC ......... *F16H 61/32* (2013.01); *B60K 2350/102* (2013.01); *F16H 2061/247* (2013.01); *F16H 2061/326* (2013.01); *Y10T 74/2014* (2015.01)
(58) Field of Classification Search
  USPC ............................ 74/473.21, 473.24, 473.25, 473.26,74/473.28, 473.3; 200/547, 318
  See application file for complete search history.

(56) References Cited

U.S. PATENT DOCUMENTS

| | | | | |
|---|---|---|---|---|
| 3,591,740 A | * | 7/1971 | Kolster | 200/61.27 |
| 3,639,706 A | * | 2/1972 | Purdy | 200/17 R |
| 4,042,903 A | * | 8/1977 | Finegan, Jr. | 338/159 |
| 4,130,080 A | * | 12/1978 | Lotz | F24C 7/082 116/2 |
| 4,332,177 A | * | 6/1982 | Andresen | 74/491 |
| 4,378,474 A | * | 3/1983 | Olson | 200/12 |
| 4,676,118 A | * | 6/1987 | Leiter | 74/473.14 |
| 5,161,422 A | * | 11/1992 | Suman et al. | 74/335 |
| 6,295,887 B1 | * | 10/2001 | DeJonge et al. | 74/473.3 |
| 6,412,802 B1 | * | 7/2002 | Kugel et al. | 280/252 |
| 6,480,752 B1 | * | 11/2002 | Blume et al. | 700/56 |
| 7,834,865 B2 | * | 11/2010 | Jannasch et al. | 345/184 |
| 7,971,498 B2 | * | 7/2011 | Meyer et al. | 74/10.41 |
| 8,490,509 B2 | * | 7/2013 | Giefer et al. | 74/473.25 |
| 2006/0060019 A1 | | 3/2006 | Sato et al. | |

FOREIGN PATENT DOCUMENTS

| | | |
|---|---|---|
| JP | 2001 159463 A | 6/2001 |
| JP | 2002 189558 A | 7/2002 |
| JP | 2005 273819 A | 10/2005 |
| WO | 2006/021198 A1 | 3/2006 |

OTHER PUBLICATIONS

International Search Report issued in international application No. PCT/EP2011/056404, mailed Jul. 5, 2011 (4 pages).

* cited by examiner

TRANSLATORY ACTIVATION DEVICE WITH INDIRECT LATCHING

The invention relates to an activation device for a shift-by-wire controlled speed gearbox, for example, for an automatic transmission or an actuator-operated manual transmission, according to the preamble of claim 1.

Gear-change transmissions for motor vehicles are generally switched or controlled by a switch activation device mounted within the range of manual reach of the driver. For this purpose, usually activation elements such as an activation lever, shift lever or selection handle are used, which are placed, for example, between the front seats of the motor vehicle or in other areas of the cockpit, for example, in the center console.

The design and in particular ergonomic requirements for such activation devices for shifting gears are increasingly diverse. For example, in order to allow the driver to have a realistic feel of the gear activation for reasons of safety and ergonomics even with electronically controlled transmissions, it is required for generic activation devices that upon the gear selection, clear haptical or tactile feedback be sent about the current switching or operating condition of the transmission. In particular, the driver should also be able to see at a glance or to intuitively feel at a grasp of the gear selector the current switching state of the transmission.

It is therefore desirable to give the driver clear feedback about the current state of the transmission or the actually engaged gear, and about a successful switching based on the respective instantaneous position of the selector lever.

For electrical or shift-by-wire activation of shifting gears, however, there exists no mechanical coupling between the activation lever in the passenger compartment and the motor vehicle transmission in the engine compartment. Rather, in the shift-by-wire transmission, the transfer of the shift commands from the activation device to the motor vehicle transmission occurs by means of electrical or electronic signals and a subsequent electrical or electro-hydraulic implementation of the switching commands in the transmission.

The lack of mechanical connection between the transmission activation system and the activation lever means, however, that the transmission condition, gear change lockouts or any unauthorized switching commands cannot initially act on the state of the activation lever directly and in a fashion that is perceptible by the driver. In contrast, in the case of classical, mechanical gears or mechanical coupling between the activation lever and the gear shift transmission—for example, by a cable or linkage—the shift lever position is generally consistent with the actual gear position because of the mechanical coupling. Since mechanically actuated gearboxes in themselves are generally multi-stable (i.e., the gear shift position is stable in several or all positions), the associated lever is also multi-stable and thus remains—just like the gear-change transmission—always in the position or stage implemented by the driver.

Therefore, on the one hand, the driver can conclude the current switching state of the transmission from the respective selector lever position, or can identify the respective gear selected in the gearbox by examining the selector lever position, and on the other hand, can rely on the fact that the selector lever position does not differ from the actual switching state of the transmission.

In the case of a by-wire-operated gear shift transmission, the lack of mechanical connection between the transmission activation system and the selector lever can thus in principle lead to a situation where under certain conditions the selector lever position no longer matches the switching state of the transmission.

So, for example, modern automatic transmissions have a so-called auto-P function, which ensures that when you leave the vehicle, the parking brake is automatically engaged in the transmission so as to prevent the unattended vehicle from moving off. With other words, the auto-P feature ensures the automatic insertion of the parking lock in the transmission gear, regardless of the actual gear selected by the selector lever. For example, the parking lock is automatically selected by the auto-P function of the transmission or the vehicle even when the selector lever has been left by the driver, for example, in the neutral position or in one of the drive positions.

In this case, however, the shift lever position no longer matches the actual switching state of the transmission. Based on the perception of the shift lever position, the driver would therefore assume that the transmission is, for example, in neutral position or in a drive position, while in contrast, parking lock is actually engaged the gearbox.

In the prior art, it is often attempted to address these issues so that the selector lever of shift-by-wire-speed gearboxes are designed as mono-stable activation elements, which after the activation always return to the same central position. In a mono-stable selector lever, the feedback on the actual switching state of the transmission is thus left to a separate gear indicator. On the other hand, a mono-stable selector lever does not allow the option of providing the driver with optical or haptical feedback on the switching state of the transmission based on the selector lever position.

Furthermore, the realization of the mechanical switching logic and the switching barriers required for the prevention of faulty operation—such as the so-called key-lock and shift-lock—in mono-stable designed selector levers tend to be costly and often requires a complex actuator system for selectively blocking unauthorized switching commands that also require significant space, causing corresponding costs. In addition, such an actuator system is often connected with unwanted noise in the activation device or the selector lever.

The known mono-stable design activation devices further have the disadvantage that the driver must adjust to a new operating concept with the lever constantly returning to the center position, where this operating concept significantly differs from the traditional transmission activation with stable selector lever positions.

With this background, it is the technical task of the present invention to provide an activation device for a vehicle transmission, which overcomes the said disadvantages existing in the prior art. The invention should propose particularly space-saving and technically simple activation devices with stable selector lever positions, which comprise a reliable, easily-moving latching for the activation element. Furthermore, the invention should realize a reliable visual and tactile feedback of the actual switching state of the transmission. The invention should also make possible an actuatory influencing of the selector lever position a simple manner.

This technical task is solved by an activation device having the features of patent claim 1.

Preferred embodiments are the subject matter of the sub-claims.

In a manner that is known if considered initially by itself, the activation device according to the present invention comprises a housing, a translatory movable activation knob, and a latching device for generating latching forces or restoring forces or the reset of the activation knobs to a particular switching position. In this design, the latching device comprises, again in principle in a known manner, a latching pin and a latching contour, which thus form the two latching elements to generate the latching or restoring forces.

According to the invention, the activation device is, however, characterized by a latching gearwheel that is in engagement with a toothing arrangement on the activation knob. In this design, one of the two latching elements of the activation device is connected to the gearwheel and thus forms a pivotable or rotatable latching element. On the other hand, the other of the two latching elements is connected—directly or indirectly—to the base housing, and thus represents a fixed latching element.

This means in other words that the translationally movable activation knob of the invention activation device obtains latching, which, however, cannot affect the easily-moving linear guide of the activation knobs—for example, by tilting—as thanks to the invention, the functions of the translational guidance on the one hand, and the latching on the other hand, are separated from each other. The latching forces thus do not act, directly on the slide rail or the linear guidance of the activation knobs, as is the case of the conventional latching, but rather are generated in a separate latching device between the latching gearwheel and the fixed latching element.

The invention is first realized regardless of which of the two latching elements is connected to the latching gearwheel and thus is in engagement with the activation knob, and regardless of which of the two latching elements is directly or indirectly supported on the base housing. For example, the latching pin can be connected to the latching gearwheel and thus to the activation knob, while the latching contour is supported directly or indirectly on the housing. In the same manner, vice versa, the latching contour can be connected to the gearwheel and thus be in engagement with the position of the activation knob, while the latching pin is supported, directly or indirectly, on the housing.

Furthermore, the manner and the structural design of the connection of the first latching element to the latching gearwheel are initially irrelevant to the realization of the invention. Preferably, however, the first latching element is formed integrally with the latching gearwheel or connected to it, whereby the number of components and thus costs can further be reduced.

According to another embodiment of the invention it is provide that the latching gearwheel is formed as a gear segment. This embodiment has the background that the displacement path of the activation knob is usually not so long for the latching gearwheel to have to make one full turn or more, when the activation knob is moved along its entire displacement path. By omitting the unnecessary angular ranges of the latching gearwheel, material can thus be saved and additional space can be won in the area of the latching device.

In principle, the latching contour may also take on a largely arbitrary form, possibly even a straight or flat form, as long as the surface of the latching contour—along the required relative path between the latching contour and the latching pin—can be followed by the latching pin. Preferably, however, the latching contour is arranged in a curve along a circular arc or a circle circumference. In this way, longer latching paths and/or a greater number of latching positions can be accommodated in the latching device, because with a circular arc-shaped or circularly arranged latching contour and with the inventive basically rotating relative movement between the latching contour and the latching pin, virtually any desired angle range is available for the latching engagement between the contour and the latching pin.

This embodiment, too, can in particular be chosen independently of whether the latching contour is arranged movably with the activation knob—i.e., on the latching gearwheel that is meshed with the activation knob—or whether the latching contour forms the second latching element that is fixed relative to the housing.

With this background, according to a further preferred embodiment of the invention, the latching contour is formed uniformly and is arranged in a continuous fashion along a circular circumference. At the same time, the second latching element can be rotationally adjusted by an actuator concentric with the first latching element, thus to the latching gearwheel.

This embodiment first of all leads to a situation where no fixed assignment between the individual locking positions of the latching contour and each activation position of the activation knob exists, because the latching contour is arranged in an endless circle in a uniformly repetitive course. In addition, in this embodiment the second latching element, i.e., the latching element supported on the housing, is actively adjustable by activation in rotation relative to the housing. Again, this is first of all applicable regardless of whether the second latching element, which is now adjustable by activation, is the contour or the latching pin, or regardless of whether the latching contour is arranged on the latching gearwheel or whether the latching contour forms the second latching element.

In other words, this embodiment first of all accomplishes that the translational position of the activation knob can be actively changed along its path of travel—by means of actuated adjustment of the rotational position of the second latching element. The actuated adjustment of the position of the activation knob is performed by the entire latching device of the latching contour and the latching pin is rotationally pivoted. The power transmission from the actuator to the activation knob thus occurs over the latching device in its entirety, without thereby causing a relative movement between the latching contour and the latching pin.

The positioning of the activation knob can so be performed by activation with minimum effort and with minimal noise, because only the low frictional resistance in the rotary bearings of the latching device and the sliding guide of the activation knob must be overcome, while the respective relative position of the latching contour and the latching pin remains unchanged. This also means that, for example, a motorized actuator with only minimal power requirements and minimum dimensions is sufficient for the adjustment of the activation knob.

This embodiment of the invention thus allows realizing the actuated repositioning of the position of the activation knob—in particular in case of any discrepancy between the knob position and the gear state—in a simple and reliable way. One possible application for this is the auto-P function of modern automatic transmissions, which, for example, when the driver is leaving the vehicle automatically inserts the parking lock, regardless of which gear is engaged in the selector lever or on the activation knob of the activation device.

In such a case, thanks to the present invention, the position of the activation knob can be repositioned, very simply and practically silently, so that upon the automatic engagement of the parking lock in the gearbox the activation knob is also located in the parking lock position so that the desired correct visual and haptical feedback on the transmission status is given to the driver.

The invention is further realized independently of how the actuator drive of the second latching element is structurally designed as long as the second latching element can be rotationally positioned by means of the actuator in the desired manner. According to a particularly preferred embodiment of the invention, the second latching element is, however, connected to an activation wheel that is mounted concentrically to the latching gearwheel. The activation wheel is in engagement with the motor actuator. Preferably, the second latching element is formed integrally with the activation wheel, or formed directly on the activation wheel.

The power transmission from the motor actuator to the activation wheel and thus to the second latching element can be realized in principle in any manner, for example, by friction or by means of a toothed belt. Preferably, the actuator motor of the activation wheel is, however, driven by gear meshing. Here, the gear engagement between the actuator and the activation wheel is preferably formed self-locking, in particular in the form of a worm gear.

The worm gear has the advantage of a large ratio in a minimum space, and is also in principle irreversible so that additional measures to block the activation wheels—for example, during the manual activation of the shift knob—can be omitted. At the rest of the motor actuator, the activation wheel, and thus also the second latching element that is connected to the activation wheel, is in principle rather blocked in rotation by the worm gear. Thus, if the shift knob is manually operated, this leads to a relative movement between the first and the second latching elements and thus to the desired locking effect during the movement of the shift knob along its linear path of movement.

According to another preferred embodiment of the invention, the tap for the position sensors of the activation device is carried out on the shaft of the latching gearwheel. By means of the position sensor, the control of the activation device determines the actual position of the activation knob along its path of movement. Thanks to this embodiment, the determination of the position of the activation knob is performed in a particularly space-saving and robust manner by means of an angle sensor, whose tap is occurring rotationally on the shaft of the latching gearwheel.

Optionally, as is further also provided according to a preferred embodiment of the invention, the tap for the position sensors of the activation device can be indirectly taken from the shaft of the latching gearwheel by arranging a pinion on the shaft of the latching gearwheel, which transfers its rotation to another pinion.

In this design, the angle sensor for determining the rotational position of the latching gearwheel—and thus the position of the activation knob—is connected to the further pinion. This embodiment is particularly space-saving, because in this way the sensors require less axial space on the shaft of the latching gearwheel. In addition, this embodiment improves the stability of the mounting of the latching gearwheel.

If the latching gearwheel is formed as a gear segment, in this embodiment, the position sensor can be accommodated, in particularly space-saving fashion, in the angular segment that is not covered by the gear segment. This leads to an overall activation device with minimum outer dimensions that can be highly flexibly integrated into the interior package of a vehicle.

In the following, the invention is explained in detail with reference to drawings containing merely exemplary embodiments. They show:

FIG. 1 shows an isometric view of an embodiment of an activation device according to the present invention, with an open housing in terms of the visibility of the latching device and the actuator of the activation device.

Figure 1:
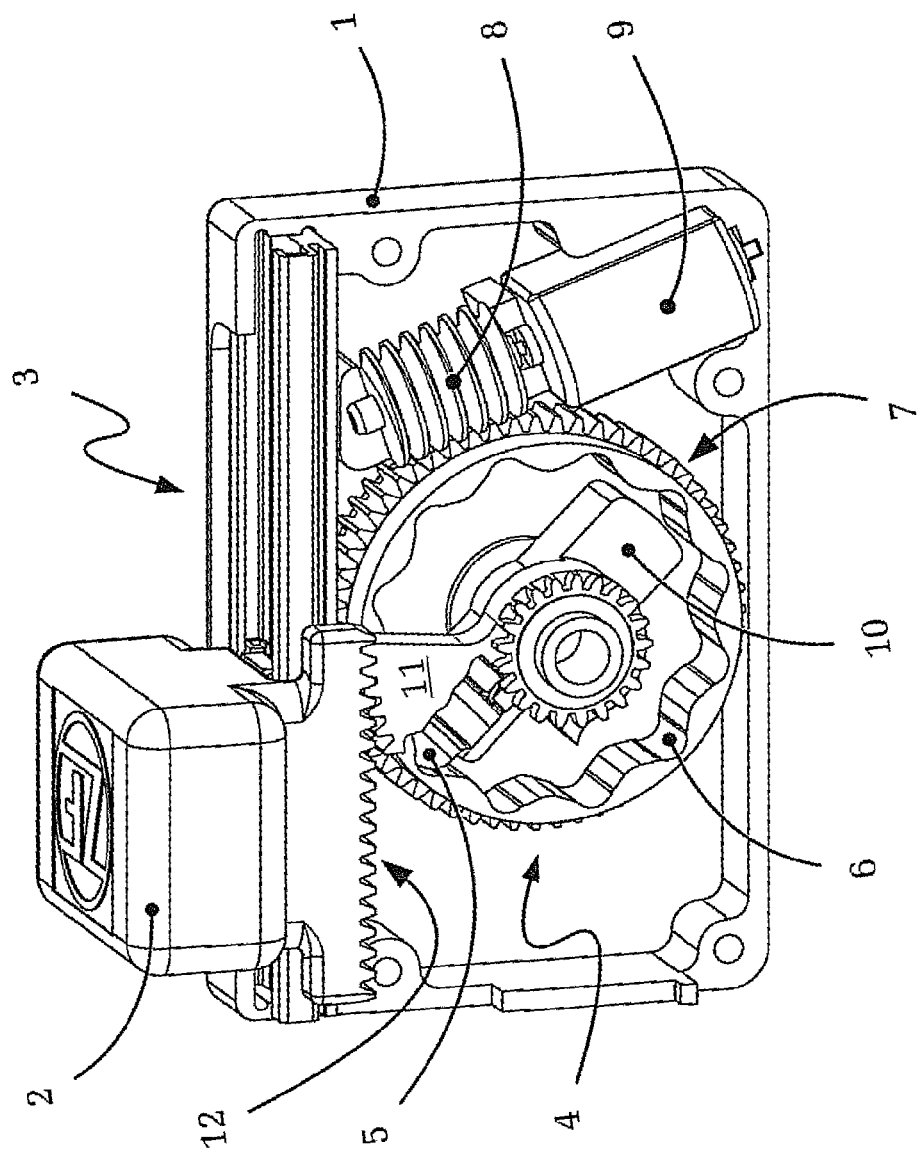
FIG. 1 shows a schematic isometric view of an embodiment for an activation device according to the present invention, with the activation knob in the P position.

Apart from the rear housing half 1, in the drawing it can be seen first an activation knob 2, which is linearly translationally mounted in the housing 1 by means of a sliding guide 3. In the case of application of the control of the shift stages in a vehicle transmission, the various switching states of the transmission, in particular the positions P, R, N, D can thus be selected by the driver by means of a linear movement of the activation knobs 2.

According to the invention, the noticeable latching of the activation knob, which is necessary for reasons of ergonomics and feel, is carried out not directly in the slide 3, but rather indirectly, in the latching device 4. For this purpose, the latching device 4 comprises a latching pin 5 and a latching contour 6, wherein the latching pin 5 is in spring-loaded engagement with the latching contour 6. The latching contour 6 is uniformly formed and arranged endlessly along the inside of activation gearwheel 7, wherein the activation gearwheel 7 is in engagement with an electromotive actuator 9 by means of a transmission screw 8. The spring housing 10 of the latching pins 5 is mounted concentrically to the activation gearwheel 7, and can thus be pivoted coaxially to the rotary activation gearwheel 7.

Integrally connected to the spring housing 10 of the latching pins 5 is the latching gearwheel 11, which is in engagement with the linear toothing 12 on the activation knob 2. On the one hand, the latching gearwheel 11 in this present form is designed as a gear segment, which covers only the rotation angle actually traveled by the translational movement of the activation knobs 2, and the other, the representation of FIG. 1 illustrates parts of the latching gearwheel 11 broken away, in order to make visible the latching pin 5 that is arranged behind the latching gearwheel 11. The actual shape of the latching gearwheel formed as a gear segment 11 can be seen in FIGS. 2 through 5.

A normal activation of the knob 2 by the driver thus initiates—over the meshing of the linear gear 12 with the latching gearwheel 11—a rotational pivoting of the latching gearwheel 11 and thus of the spring housing 10 as well as the latching pins 5. The latching pin 5 physically scans the latching contour 6 on the inside of the activation gearwheel 7, which is blocked in rotation by means of the worm gear 8, and thus produces the desired latching or restoring forces that are noticeable by the driver on the activation knob 2.

Figure 2:
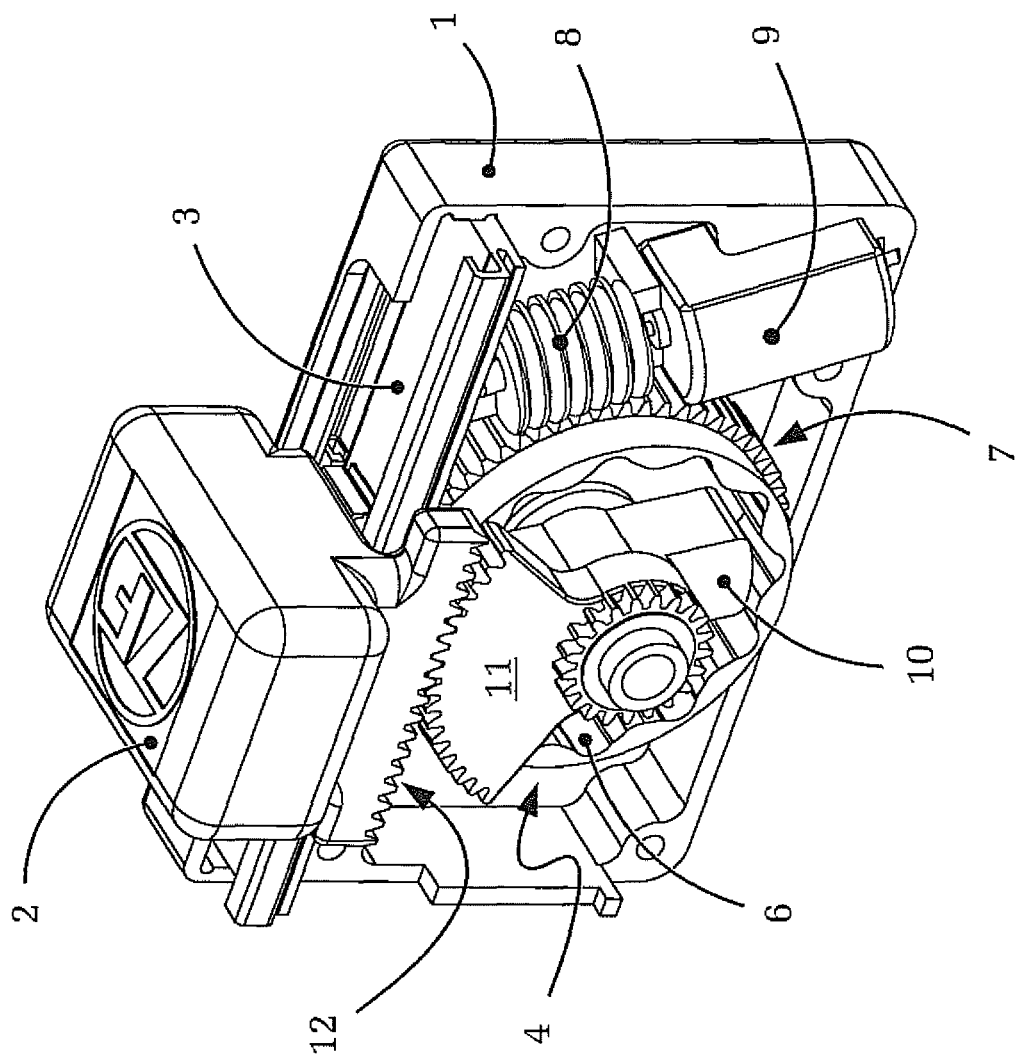
FIG. 2 shows an isometric view of the activation device in accordance with FIG. 1 with the activation knob in the R-position.
Figure 3:
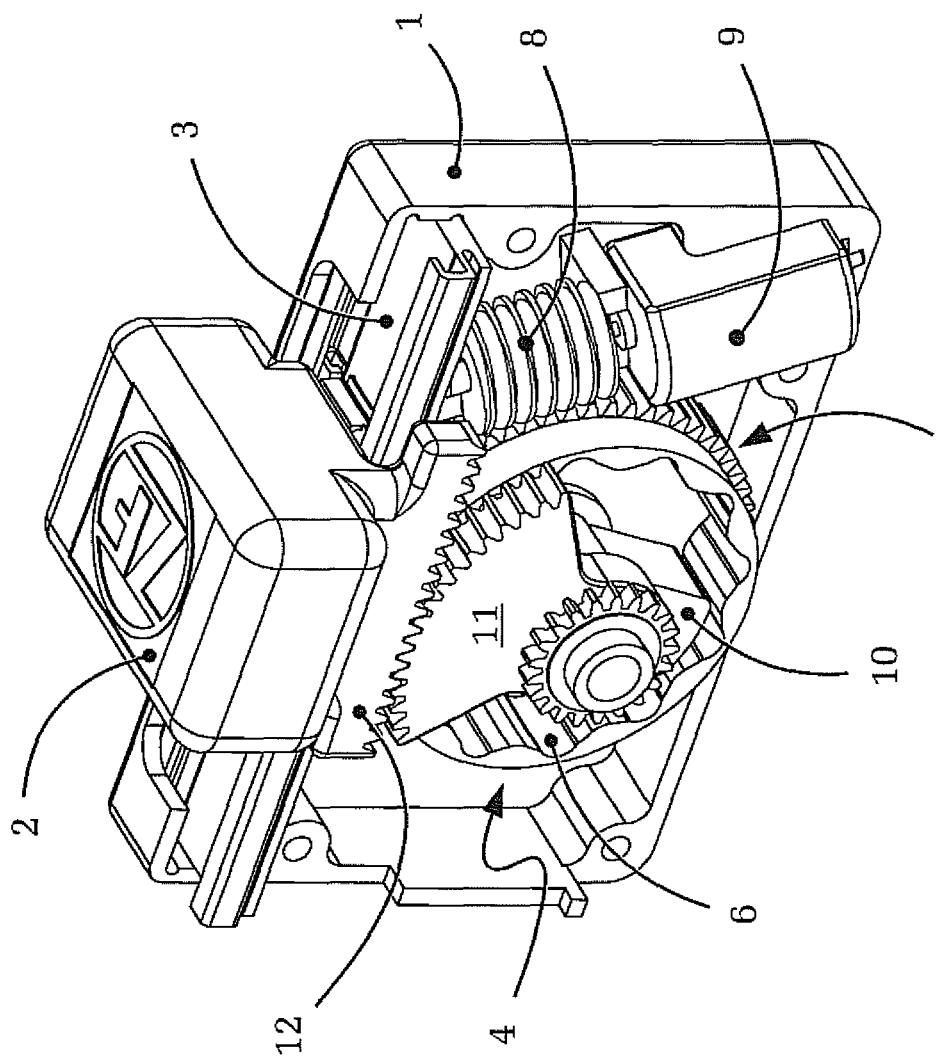
FIG. 3 shows a view corresponding to that of FIG. 2, namely an activation device according to FIGS. 1 and 2 with the activation knob in the N-position.
Figure 4:
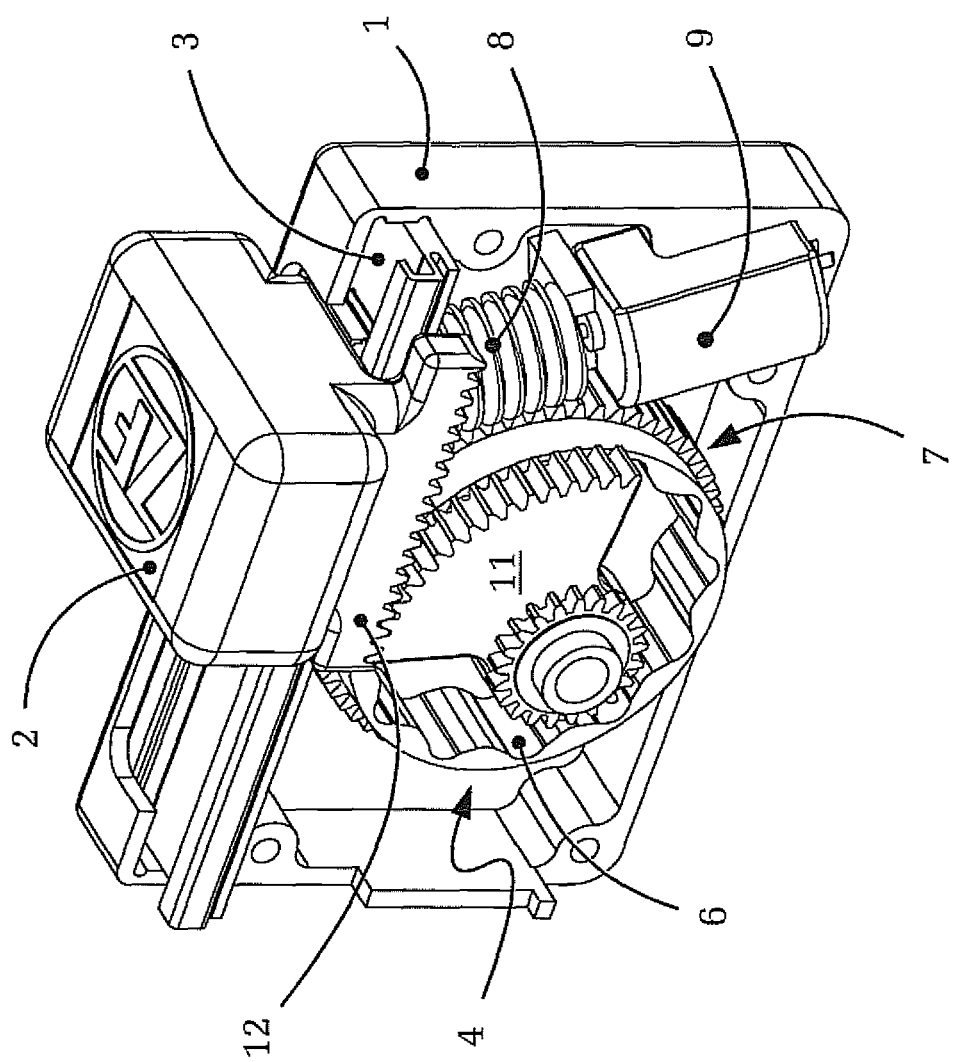
FIG. 4 shows a view corresponding to that in FIGS. 2 and 3, namely the activation device according to FIGS. 1 to 3 with the activation knob in the D position.

The sequence of the switching of the activation knob 2 is schematically shown in FIGS. 2 to 4. In FIG. 2, the activation knob 2 was moved from the position P of FIG. 1 to position R. Accordingly, the latching gearwheel 11, and also the spring housing 10 integrally connected to the latching gearwheel 11 and the latching pin 5 disposed therein (not visible here because it is hidden behind the latching gearwheel 11) (See FIG. 1) are rotationally pivoted, whereby the latching pin 5 was moved from its latching position in the latching contour 6 of FIG. 1 to the adjacent latching position of the latching contour 6 according to FIG. 2. This also locks the activation knob 2 again noticeably—corresponding to the gear shift position R—along the slide 3.

Similarly, the activation knobs 2 is moved to the N position as shown in FIG. 3 and finally to the position D of FIG. 4. Here, the latching gearwheel 11 and the associated latching pin 5 are rotationally pivoted in each case by one intermediate stop position in the latching contour 6. The respective latching forces are transferred over the gearwheel 11 and the linear gearing 12 onto the activation knob 2.

In the described activations of the knob 2 according to FIGS. 1 to 4 the motor actuator 9 remains off at all times. This is the activation gearwheel 7 is also blocked in rotation due to its engagement with the worm gear 8 of the actuator 9, as well as the latching contour 6 that is arranged on the inside of activation gearwheel 7. Up to this point, the latching device 4 from the latching pin 5 and the latching contour 6 (see FIG. 1) acts as a normal, passive latching device.

However, once for example the auto-P function of the vehicle transmission enters into action, for example, when the driver parks the car and leaves it without first inserting the parking lock, the position of the activation knob 2 of the parking lock automatically engaged in the motor vehicle transmission can be repositioned by means of the actuator 9. Upon returning to the vehicle, the driver therefore finds the activation knob 2 in the position P that matches the state of the transmission, so that the driver can be in no doubt about the switching state of the transmission.

The automatic repositioning of the activation knobs 2 to the position of the knob matching the switching state of the transmission occurs in the embodiment shown in the figures by means of the motor actuator 9. For this purpose, the actuator 9 rotates by means of the worm gear 8 the activation gearwheel 7 and thus also the latching contour 6 that is arranged on the inside of the activation gearwheels 7. This rotation of the contour latching 6 is also followed by the latching pin 5 (see FIG. 1), whereby the rotation of the activation gearwheel 7, latching contour 6 and the latching pin 5 transfers also to the latching gearwheel 11, which is connected by the latching pin 5. The rotation of the latching gearwheel 11 in turn leads over the tooth engagement between the latching gearwheel 11 and the linear gearing 12 to the desired linear displacement of the activation knob 2 into the shift position matching the switching state of the transmission.

Since in such an actuatory repositioning of the activation knob 2 the latching between the latching pin 5 and the latching contour 6 remains intact and need not be overcome, a minimally sized actuator 9 is sufficient for this purpose.

For the same reasons, virtually no unwanted noise arises during the repositioning of the activation knob 2, for example, into the position P.

Since in the illustrated embodiment of the invention the restoring force—for the actuatory repositioning or movement of the activation knob 2—is transferred from the actuator 9 over latching contour 6 co-rotating with the activation gearwheel 7 and over the also co-rotating latching pin 5, wherein no relative movement occurs between the latching contour 6 and the latching pin 5, in this form the activation device already has an overload protection for the case of any abuse.

For example, should during its actuatory movement or repositioning the activation knob 2 be held by the driver (or should the activation knob 2 for example be blocked by an object), the latching device consisting of the latching pin 5 and the latching contour 6 would limit the force transferred to the activation knob 2 in that the latching contour 6 would slide under the—in this case blocked—latching pin 5. An overload of individual components of the activation device is thus already excluded by the design so that additional measures for overload protection, particularly of the actuator 9, as they are required in the prior art (for example in the form of a thermal protection device) can be omitted.

The actuator-variable position of the activation knob 2 can also be used for the realization of other functions of the activation device. In particular, it can also provide the so-called shift lock and key lock functions of an automatic transmission, in which the transmission remains in a certain switching state until the driver meets specific activation conditions, such as starting the engine or stepping on the brake pedal before inserting a transmission speed. If the driver does not meet these activation conditions required for security, the activation knob actuator 2 can be repositioned from the currently prohibited gear position into a position corresponding to the current state of the gear. In this way, the driver can be clearly signaled the currently unacceptable transmission activation.

Figure 5:
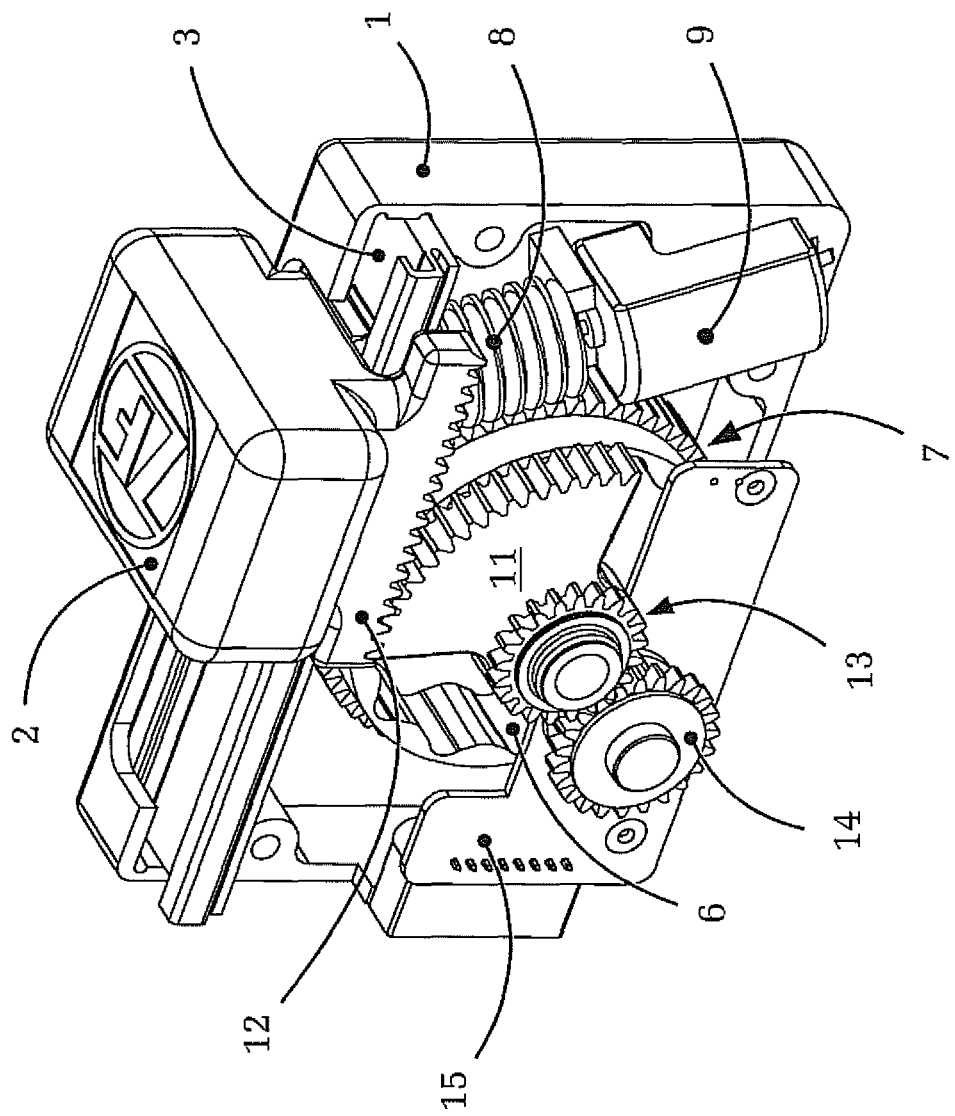
FIG. 5 shows, in a view corresponding to that of FIGS. 2 to 4, an activation device according to FIGS. 1 to 4 with a sensor board and gearwheel tap for the angle sensor.

The sensor system required for determining the current position of the activation knobs 2 is schematically shown in FIG. 5. One can see a pair of pinions 13, 14 and a sensor board 15. Using the pinion gear pair 13, 14, the actual rotational angular position of the latching gearwheel 11 (and thus the current linear position of the activation knob 2) is picked off and transferred to a (not shown) angle sensor on the sensor board 15. The angle sensor can be arranged on the back of the sensor board 15—in the space that is not traveled by the segment of the latching heel 11—thereby resulting in the represented, particularly compact and flat design of the activation device.

Figure 6:
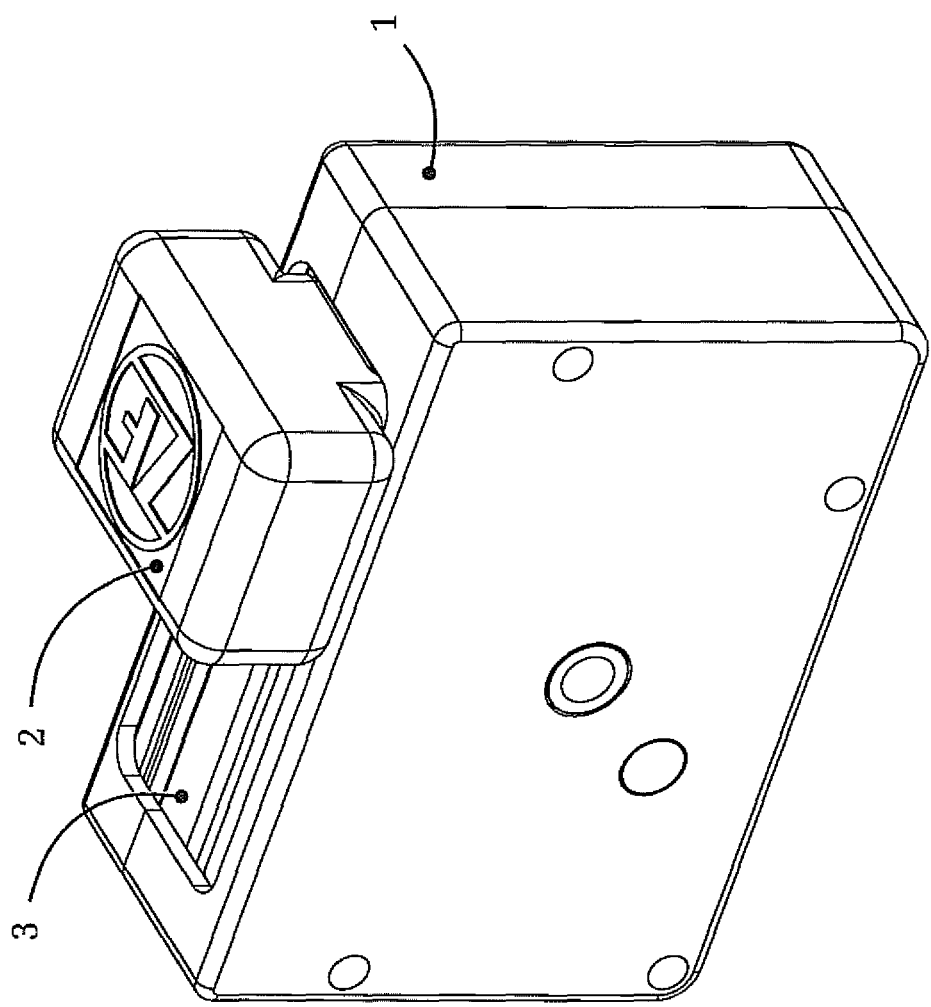
FIG. 6 shows, in a view corresponding to that of FIGS. 2 to 5, the activation device according to FIGS. 1 to 5 with a closed housing.

The latter is apparent in particular from FIG. 6. It is apparent that the entire activation device, including the contained latching device and the actuator system takes up only minimal installation space and, in particular, is extremely flat. The activation device according to the invention can thus be accommodated with great flexibility in the respectively desired position in the vehicle. In addition, due to the minimal noise in the actuatory movement of the activation knob 2, no specific noise-dampening measures are required.

As a result, it is clear that the invention provides a space saving, low-noise and structurally simple activation device for a shift-by-wire-operated gear. Due to the separate latching device that indirectly acts on the activation knob, any stiff operation or tilting of the activation knob is avoided. At the same time, the latching device realizes a reliable tactile feedback about the inserted gear position. Finally, the invention also allows that the selector lever position in shift-by-wire controlled vehicle transmissions visually and tactilely always reflects the actual switching state of the transmission, and thus offers significant advantages, in particular compared to conventional mono-stable activation devices for shift-by-wire-controlled vehicle transmissions.

The invention thus makes a vital contribution to improving the ergonomics, ease of use and the installation space and cost effectiveness, particularly in the current applications in the field of electronically controlled transmission activation of motor vehicles.

LIST OF REFERENCE NUMERALS

1 Housing
2 Activation knob
3 Slide
4 Latching device
5 Latching pin
6 Latching contour
7 Activation gearwheel
8 Worm gear
9 Actuator
10 Spring housing
11 Latching gearwheel
12 Linear teeth
13, 14 Pinions
15 Sensor board

The invention claimed is:

1. An activation device for the selection of shift stages of a shift-by-wire transmission, the activation device comprising:
   a base housing;
   an activation knob configured to move translationally with respect to the base housing;
   a latching device, the latching device having a latching pin and a latching contour as latching elements for generating latching forces and restoring forces;
   a latching gearwheel engaged with a toothing arrangement on the activation knob, wherein a face of the latching gearwheel is rotatable within a plane;
   a first latching element wherein the first latching element is either the latching pin or the latching contour, the first latching element connected to the latching gearwheel to form a rotatable latching element; and
   a second latching element wherein the second latching element is either the latching pin or the latching contour, the second latching element coupled to the base housing to form a fixed latching element, wherein at least a portion of the activation knob is located on the same side of the plane as the latching contour.

2. The activation device of claim 1 wherein the first latching element is integrally formed on the latching gearwheel.

3. The activation device of claim 1 wherein the latching gearwheel is formed as a gear segment.

4. The activation device of claim 1 wherein the latching contour is arranged along a circular arc or a circle circumference.

5. The activation device of claim 1 wherein the latching contour is formed uniformly and arranged endlessly along a circular periphery, and wherein the second latching element is rotationally actuator-adjustable such that the axis of rotation of the second latching element is concentric to the latching gearwheel.

6. The activation device of claim 1 wherein the second latching element is connected indirectly to the base housing, wherein the second latching element is connected to an activation wheel concentrically rotatable to the latching gearwheel, and wherein the activation wheel is engaged with a motorized actuator.

7. The activation device of claim 6 wherein the second latching element is formed integrally with the activation wheel.

8. The activation device of claim 6 wherein the activation wheel is connected to the actuator by a gear engagement.

9. The activation device of claim 8 wherein the gear engagement is designed to be self-locking.

10. The activation device of claim 8 wherein the gear engagement is designed as a worm gear.

11. The activation device of claim 1 wherein a tap for a position sensor system of the activation device occurs at a shaft of the latching gearwheel.

12. The activation device of claim 11 wherein a tap for the position sensor system of the activation device occurs indirectly on the shaft of the latching gearwheel by means of a pair of pinions.

* * * * *